(12) United States Patent
Gupta et al.

(10) Patent No.: US 9,420,037 B2
(45) Date of Patent: Aug. 16, 2016

(54) METHOD AND APPARATUS FOR PROVIDING FAULT TOLERANCE DURING LIVE STREAMING

(71) Applicant: Adobe Systems Incorporated, San Jose, CA (US)

(72) Inventors: Piyush Gupta, Pitampura (IN); Mohit Srivastava, Noida (IN)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 244 days.

(21) Appl. No.: 14/261,881

(22) Filed: Apr. 25, 2014

(65) Prior Publication Data

US 2015/0312302 A1  Oct. 29, 2015

(51) Int. Cl.
G06F 15/16 (2006.01)
H04L 29/08 (2006.01)
H04L 29/06 (2006.01)

(52) U.S. Cl.
CPC ............ *H04L 67/10* (2013.01); *H04L 65/4084* (2013.01); *H04L 65/605* (2013.01); *H04L 65/80* (2013.01)

(58) Field of Classification Search
CPC ....... H04L 65/602; H04L 67/10; H04L 1/835; H04L 2012/6489; H04L 65/4084; H04L 65/605; H04L 65/80; G05B 23/0235; G06F 11/008
See application file for complete search history.

(56) References Cited

U.S. PATENT DOCUMENTS

| | | | |
|---|---|---|---|
| 9,125,109 B1* | 9/2015 | Vivanco | H04W 36/0044 |
| 2014/0059243 A1* | 2/2014 | Reisner | H04N 21/23439 |
| | | | 709/231 |

* cited by examiner

*Primary Examiner* — Chirag R Patel
*Assistant Examiner* — Jean P Mendez Flores
(74) *Attorney, Agent, or Firm* — Keller Jolley Preece

(57) ABSTRACT

A computer implemented method and apparatus for providing fault tolerance during live streaming. The method comprises creating a global manifest comprising a plurality of first entries extracted from a first manifest, wherein the first manifest comprises one or more entries of a predetermined sequence, each entry corresponding to a media fragment to be played in the predetermined sequence on a media player; identifying a gap in the plurality of first entries; receiving a second manifest; and upon receiving a second manifest comprising at least one second entry, extending the global manifest to include the at least one second entry, wherein the at least one second entry comprises a second entry that is in sequence after a last entry in the global manifest, and the at least one second entry in sequence after the last entry in the global manifest does not include a gap.

20 Claims, 3 Drawing Sheets

METHOD AND APPARATUS FOR PROVIDING FAULT TOLERANCE DURING LIVE STREAMING

BACKGROUND OF THE INVENTION

1. Field of the Invention

Embodiments of the present invention generally relate to live streaming and, more particularly, to techniques for providing fault tolerance during live streaming.

2. Description of the Related Art

Media players retrieve media content from one or more origin servers that store the media content in small fragments. The media player requests each fragment from an origin server whose location is specified by a Universal Resource Locator (URL) in a manifest file (also referred to herein as a "manifest"), the manifest previously received from the origin server. The manifest describes the different representations and fragments of the media content being retrieved and the sequence in which they are to be played. The media player re-fetches the manifest periodically. The media player requests media fragments. A reverse proxy in turn requests each fragment from one or more origin servers, utilizing 503 failover, and delivers each fragment to the requesting media player. This fault tolerance is a system's ability to keep operating in spite of problems that occur in the system. If a fragment is not available from a first origin server, the fragment is requested from a second origin server. Additionally, once a fragment is determined to be missing at the first origin server, the media player (i.e., client) does not send any future requests for media content to the first origin server. If the list of origin servers from which media content may be retrieved becomes exhausted, playback of the media content stops. Exhausting possible origin servers is likely if the media player (i.e., client) makes decisions regarding retrieval of media content. However, exhausting origin servers may result in a cessation of media content playback when the media content is actually still available at one of the origin servers from which one of the fragments was determined to be missing previously. Therefore, there is a need for a method and apparatus for extending a manifest so as to provide fault tolerance during live streaming in a client agnostic way.

SUMMARY OF THE INVENTION

A method for providing fault tolerance during live streaming is described. The method creates a global manifest comprising a plurality of entries extracted from a first manifest. The first manifest comprises entries of a predetermined sequence, where each entry corresponds to a media fragment that is to be played in the predetermined sequence on a media player. When the method identifies a gap in the first entries, the method receives a second manifest. When a second manifest is received, the method determines whether the second manifest includes an entry that follows in sequence a last entry in the global manifest. If so, the method determines if there is a gap in the entries in the second manifest that follow said entry that follows in sequence the last entry in the global manifest. If no gap exists, the global manifest is extended to include the entries that follow in sequence from the last entry in the global manifest.

In another embodiment, an apparatus for extending a manifest for providing fault tolerance during live streaming is described. The apparatus comprises a manifest extension module for creating a global manifest comprising a plurality of entries extracted from a first manifest. The first manifest comprises entries of a predetermined sequence, where each entry corresponds to a media fragment that is to be played in the predetermined sequence on a media player. When a second manifest is received, the manifest extension module determines whether the second manifest includes an entry that follows in sequence a last entry in the global manifest. If so, the manifest extension module determines if there is a gap in the entries in the second manifest that follow said entry that follows in sequence the last entry in the global manifest. If no gap exists, the global manifest is extended to include the entries that follow in sequence from the last entry in the global manifest.

In yet another embodiment, a computer readable medium for extending a manifest for providing fault tolerance during live streaming is described. The computer readable medium includes instructions that that, when executed by at least one processor causes the at least one processor to perform the method for providing fault tolerance during live streaming.

The Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Figure 1:
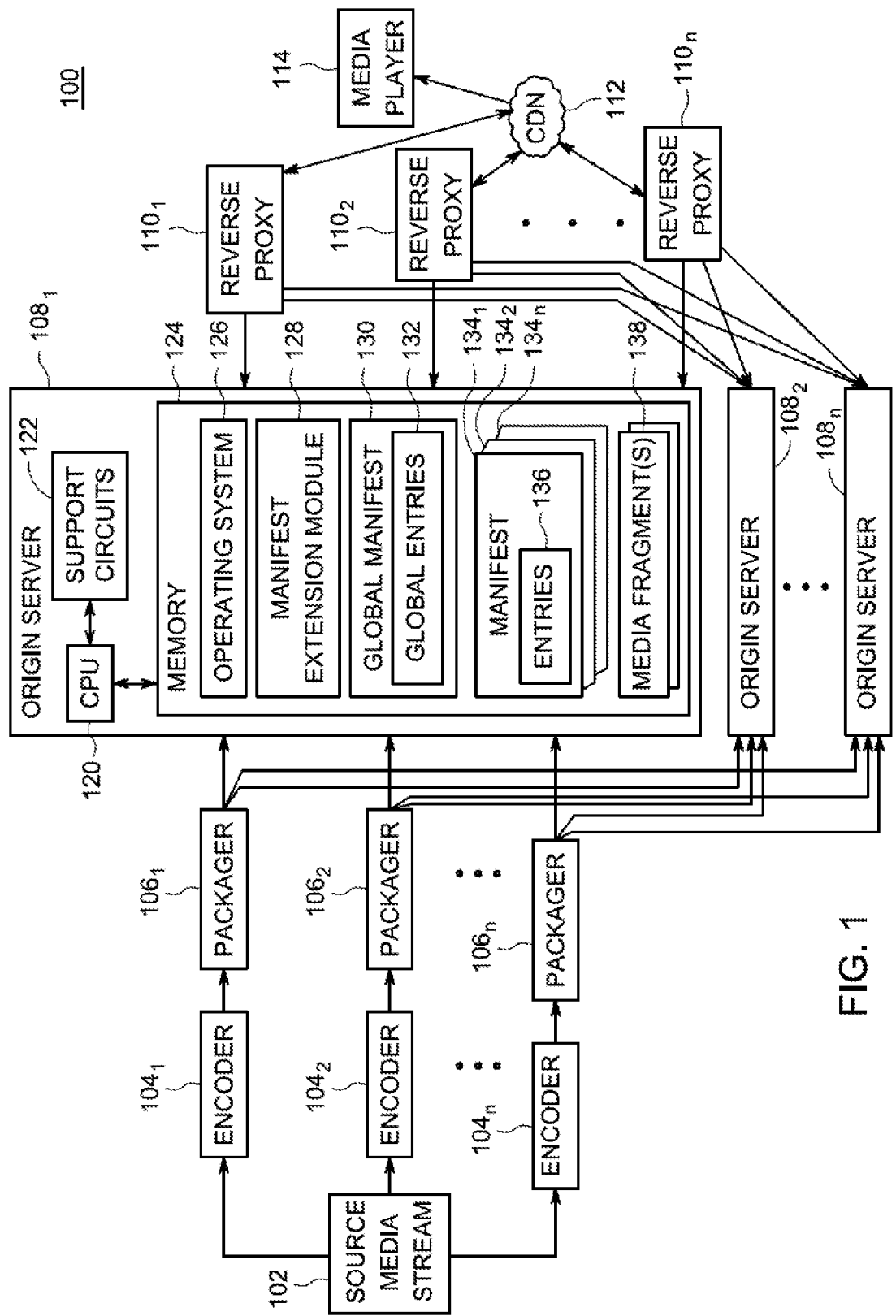
FIG. 1 is a block diagram of a system for providing fault tolerance during live streaming, according to one or more embodiments.

While the method and apparatus is described herein by way of example for several embodiments and illustrative drawings, those skilled in the art will recognize that the method and apparatus for providing fault tolerance during live streaming is not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the method and apparatus for providing fault tolerance during live streaming defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Live media content, such as a sporting event, is streamed through an elaborate system before it arrives at a media player for viewing. If one or more parts of the system fail, it may result in a failure to playback the media content. As described previously, existing solutions include client (i.e., media player) driven methods for handling failover. However, client driven methods result in a media player looking for a fragment on a server where it is not present or worse, failing to look for a fragment on a server where in fact the fragment is stored, thereby causing playback of media content to stop, when the media content is still available.

Thus, and in accordance with an embodiment of the present invention, techniques are provided herein that allow for extending a manifest to provide fault tolerance during live streaming. An origin server receives manifests from a plurality of packagers and creates therefrom a global manifest. Each manifest includes a sequence of entries, where each entry identifies a fragment of media content. Each entry also includes at least a Universal Resource Locator (URL) that indicates from where the fragment can be downloaded, and a time code that identifies the time in the sequence for each fragment to play as well as a duration of each fragment.

The origin server creates a global manifest using information from each manifest received from a plurality of packagers. Each manifest received from each packager includes a listing of media fragments that are to be played in sequence on a media player. The listing (i.e., the manifest) from a first packager may be different from the listing from a second packager. For example, the first packager may include a listing of fragment1, fragment2, and fragment3, while the listing from the second packager includes fragment1, fragment2, fragment3, and fragment4. Although the listings may be different, the number and name of each media fragment is the same across all packagers. The name and number of each fragment must be the same across all packager so that the origin server can treat each fragment the same way regardless of the packager from which it was received. The global manifest is an aggregation of the individual manifests received by an origin server from a plurality of packagers. When the origin server receives a manifest from a packager, the origin server determines whether any entries exist in the received manifests that were not received in a previous manifest. In other words, whether any entries exist for fragments after an end time of a last fragment in the global manifest). If so, the origin server determines whether a gap exists in the sequence of the entries, meaning entries are missing in the sequence of fragments. If a gap exists, the origin server waits to receive another manifest that includes the one or more missing entries. When a manifest is received that includes the missing entries, the global manifest is extended to include the missing entries. Extending the global manifest includes appending entries to the end of the global manifest. Existing entries in the global manifest are not amended. The described process is performed on each origin server. As such, every origin server creates a global manifest that reflects the global state of the system. Because the global manifest is created from a union of manifests from a plurality of packagers, gaps received from one or more packagers are filled in with entries from other packagers.

Hence, the global manifest on an origin server is created based on the manifests that the origin server receives from each packager rather than from the fragments the origin server receives. As such, a global manifest from a first origin server may include entries that are not available from the first origin server. For example, a packager may send a fragment, namely fragment5 to a first origin server when the origin server is offline, but the first origin server is back online when the packager sends its manifest that includes fragment5 to the first origin server. At the same time, the packager sends the fragment5 and the manifest that includes fragment5 to a second origin server that is able to receive the fragment and also update its global manifest. When a media player requests fragment5 from the first origin server based on the manifest received from the first origin server, the media player's request is routed to a reverse proxy. The reverse proxy attempts to retrieve fragment5 from the first origin server. The first origin server does not have the fragment5 and so responds with a 503 error. This logic is referred to as 503 failover. The reverse proxy, upon receive of the 503 response, attempts to retrieve fragment5 from, for example, the second origin server. The second origin server sends fragment5, which is then cached by the reverse proxy and sent to the media player, and the media player receives the requested fragment for playback.

Advantageously, with embodiments of the present invention, fault tolerance is handled at the origin server rather than at the media player. Embodiments of the present invention have universal applicability as there are no requirements imposed by the invention on neither the delivery protocol nor the player implementation. Any transient failure at a packager, origin server, or network link is effectively mitigated as an origin server is able to recover missing fragments in its global manifest from the packagers' manifest.

Various embodiments of a method and apparatus for providing fault tolerance during live streaming are described. In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description that follow are presented in terms of algorithms or symbolic representations of operations on binary digital signals stored within a memory of a specific apparatus or special purpose computing device or platform. In the context of this particular specification, the term specific apparatus or the like includes a general-purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

FIG. 1 is a block diagram of a system 100 for providing fault tolerance during live streaming, according to one or more embodiments. The system 100 includes a source media stream 102, a plurality of encoders $104_1$, $104_2$, ... $104_n$, collectively referred to herein as the encoder 104, a plurality of packagers $106_1$, $106_2$, ... $106_n$, collectively referred to herein as the packager 106, a plurality of origin servers $108_1$, $108_2$, ..., $108_n$, collectively referred to herein as the origin server 108, a plurality of reverse proxies $110_1$, $110_2$, ... $110_n$, collectively referred to herein as the reverse proxy 110, a content distribution network 112, and the media player 114. The encoder 104 receives the source media stream 102 and encodes the source media stream 102 into various bitrate renditions, hereafter referred to as media content. The encoder 104 sends the encoded content to the packager 106. In a system 100 where the encoder 104 also packages the encoded content, the packager 106 is not required. The packager 106 segments the encoded content into "chunks", called fragments and maintains a playlist of fragments, the playlist herein referred to as a manifest. The packager 106 packages the fragments and sends the fragments and the manifest to the origin server 108. The packager 106 may also add metadata to enable dynamic insertion of advertising content, synchronization between multi-bit-rate streams, content protection, and the like. The origin server 108 receives a manifest 134 from the packager 106 along with media fragments 138 corresponding to the entries 136 in the manifest 134. The origin server 108 is responsible for providing the packaged media fragments 138 to a media player 114 via the content delivery network 112. The reverse proxy 110 is a stateless server that serves as an endpoint for player requests. The reverse proxy 110 handles requests for media fragments 138. The reverse proxy 110 implements fault tolerance logic, referred to as failover logic, to ensure high availability of packaged content. The CDN 112 is responsible for caching and scalable delivery of the packaged content to the media player 114. The media player 114 pulls packaged content from the origin server 108 via the CDN 112 and plays the fragments in accordance with the sequence of global entries 132 listed in the global manifest 130.

The origin server 108 is a computing device, for example a desktop computer, laptop, tablet computer, and the like. The origin server 108 includes a Central Processing Unit (CPU) 120, support circuits 122, a memory 124. The CPU 120 may include one or more commercially available microprocessors or microcontrollers that facilitate data processing and storage. The various support circuits 122 facilitate the operation of the CPU 120 and include one or more clock circuits, power supplies, cache, input/output circuits, and the like. The memory 124 includes at least one of Read Only Memory (ROM), Random Access Memory (RAM), disk drive storage, optical storage, removable storage and/or the like.

The memory 124 includes an operating system 126, a manifest extension module 128, a global manifest 130, and a plurality of manifests $134_1$, $134_2$, ... $134_n$, collectively referred to as manifest 134, and a plurality of media fragments 138. The global manifest 130 includes a plurality of global entries 132. Each manifest 134 includes one or more entries 136. The operating system 126 may include various commercially known operating systems.

At the start of a media stream, the origin server 108 receives a manifest 134. The manifest 134 is typically received from a packager 106, which receives media content from an encoder 104. The encoder 104 ingests the media content from a media content source and encodes the source media stream 102 into various bitrate renditions. The encoder 104 could optionally package the encoded media content, in which case a separate packager 106 is not required. However, the present disclosure is described with reference to a plurality of packagers 106. The packager 106 receives the encoded media content from the encoder 104, segments the encoded media content into "chunks", called fragments, and generates a playlist of the fragments, which playlist is hereafter referred to as a manifest 134. The manifest 134 includes, in order of playback, a sequence of entries 136, wherein each entry 136 is associated with a media fragment 138. Each entry 136 includes a URL that points to a location where the media fragment 138 can be downloaded, and a duration of each media fragment 138. The manifest 134 may also include metadata, for example, to facilitate dynamic advertising insertion, entitlement/DRM-metadata if the media content is encrypted, and the like.

The origin server 108 is responsible for providing the media fragments 138 for delivery to a media player 114 via a content delivery network (CDN) 112. The manifest extension module 128 receives the manifest $134_1$ from a first packager $106_1$ in addition to the media fragments 138 associated with the sequence of entries 136 in the manifest 134. The manifest extension module 128 stores the media fragments 138 received from the first packager $106_1$ and analyzes the manifest $134_1$. For example, a manifest $134_1$ received from first packager $106_1$ may include entries 136 for fragment1, fragment2, and fragment3. The manifest extension module 128 generates a global manifest 130 with a listing of global entries 132 of fragment1, fragment2, and fragment3.

The manifest extension module 128 may then receive a manifest $134_2$ from a second packager $106_2$ that includes, for example, entries 136 for fragment1, fragment2, fragment3, and fragment4. The manifest extension module 128 determines that fragment4 is the next fragment after fragment3 (i.e., the last global entry 132 in the global manifest 130) and extends the global manifest 130 to now include fragment4, thereby creating a listing of global entries 132 that include fragment1, fragment2, fragment3, and fragment4. The manifest extension module 128 may then receive a manifest $134_1$ from the packager $106_1$ that includes entries 136 for fragment1, fragment2, fragment3, fragment4, and fragment6. The manifest $134_1$ from the packager $106_1$ has a gap in the entries 136, specifically missing fragment5. The gap may have been created because the packager $106_1$ was off-line when fragment5 was being created or the fragment was lost due to other network issues. The manifest extension module 128 determines that entries 136 exist in the manifest $134_1$ that are not in the global manifest 130, but also determines that a gap exists in the entries 136. Due to the fact that the manifest $134_1$ has a gap, the manifest extension module 128 does not extend the global manifest 130 so as to include the entries 136. Rather, the manifest extension module 128 waits to receive another manifest 134, either from the same packager $106_1$ or from a different packager, for example, packager $106_2$, or packager $106_n$ that includes the missing entries 136, for example a manifest 134 that includes fragment3, fragment4, fragment5, and fragment6.

When a manifest 134 is received that includes the missing entry, the manifest extension module 128 extends the global manifest 130 to include the entries 136 that follow in sequence after a last global entry 132 in the global manifest 130. The manifest extension module 128 also stores the media fragments 138 that it receives from packager 106 along with the global manifest 130. For example, the manifest 134 may include entries 136 for fragment4, fragment5, fragment6, and fragment7. The last global entry 132 is fragment4. The manifest 134 includes fragment5, which is the next fragment in sequence after fragment4 (i.e., the last global entry 132 in the global manifest 130). In addition, the entries 136 in the manifest 134 after fragment4 (i.e., fragment5, fragment6, and fragment7) do not include a gap. Therefore, the global manifest 130 is extended to now include global entries 132 for fragment4, fragment5, fragment6, and fragment7.

If the manifest extension module 128 does not receive a manifest 134 that includes the missing entries, the manifest extension module 128 continues to wait for a pre-defined threshold, for example, three fragments, and then extends the global manifest 130 to include the gap. For example, suppose fragment5 is missing. A manifest 134 includes fragment3, fragment4, fragment6, and fragment7. There are two fragments beyond the missing fragment in the manifest 134 (i.e., 7−5=2). The wait-threshold corresponds to three (3) fragments. Because there are only two (2) fragments, the global manifest 130 is not extended to include the gap. However, suppose, for example that the manifest 134 includes fragment4, fragment6, and fragment9. The last fragment in the manifest 134, fragment9 is four (4) fragments higher than the missing fragment5. As such, the global manifest 130 is extended to include the gap for fragment5. Fragment6 is appended to the global manifest 130. However, fragment7 and fragment8 are within the wait threshold as 9−7<3. Therefore, the global manifest is not extended to include the gaps for fragment7 and fragment8. The manifest extension module 128 determines whether the difference between the gap and an end-time of a last fragment referenced in the manifest 134 exceeds the predefined wait threshold. When the wait threshold is exceeded, the manifest extension module 128 extends the global manifest 130 with the global entries 132 that include the gap.

Figure 2:
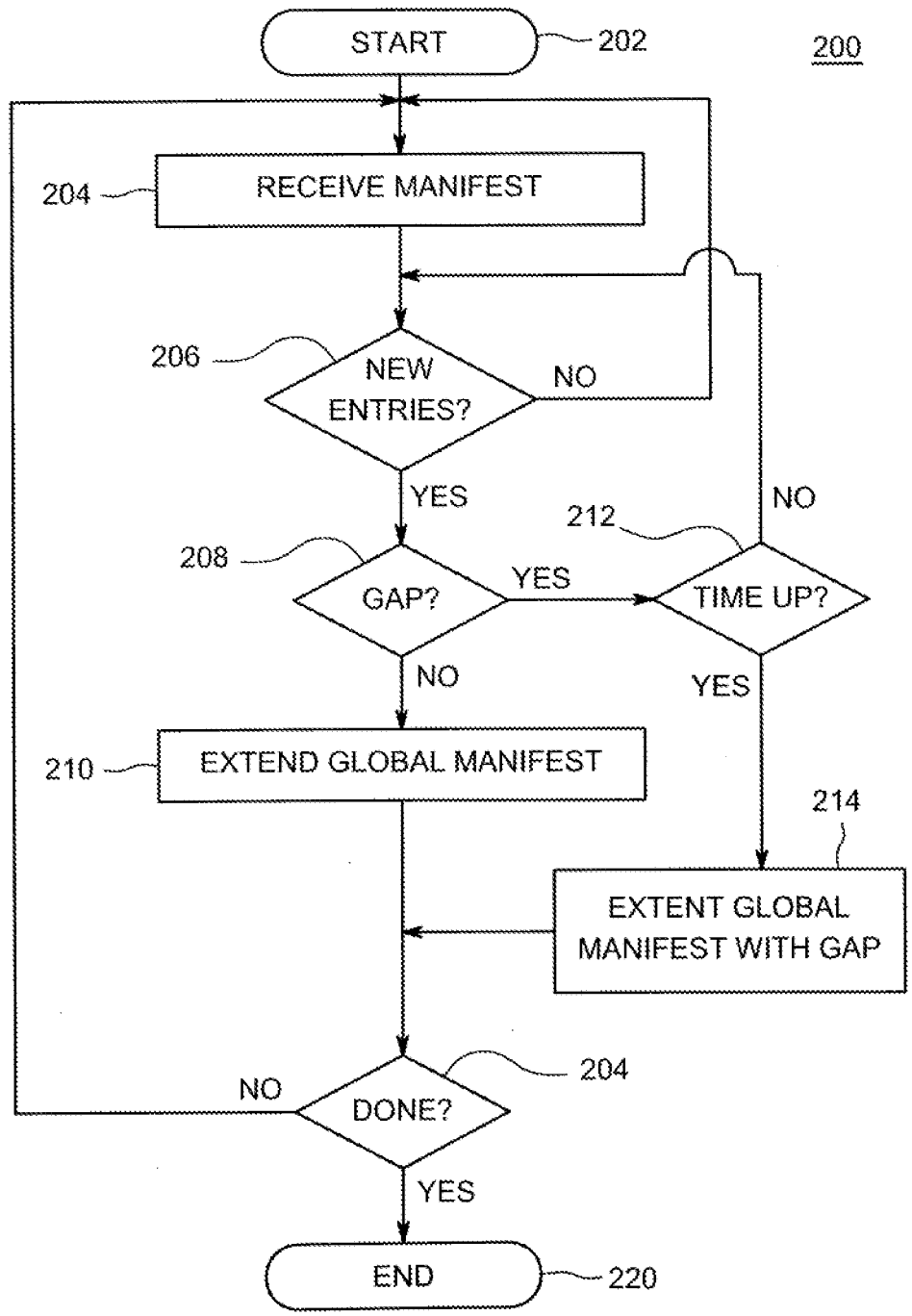
FIG. 2 depicts a flow diagram of a method for providing fault tolerance during live streaming as performed by the manifest extension module of FIG. 1, according to one or more embodiments.

FIG. 2 depicts a flow diagram of a method 200 for providing fault tolerance during live streaming as performed by the manifest extension module 128 of FIG. 1, according to one or more embodiments. When a manifest is received from a first packager that includes gaps in the entries, the method 200 waits for a manifest from a second packager that has no gaps and generates a global manifest that includes all entries available from all packagers in a network. The method 200 is initiated at the start of live streaming media content and continues until the end of the live streaming media content. The live streaming media content is broken into small chunks, called fragments, where each fragment may be, for example, 10 seconds of the media content. A manifest is created that includes a list of the fragments and a universal resource locator (URL) that identifies from where the fragments may be downloaded. The method 200 starts at step 202 and proceeds to step 204.

At step 204, the method 200 receives a manifest. The manifest may be received from a packager. The method 200 proceeds to step 206, where the method 200 determines whether the manifest is the first manifest received for the media content. If the method 200 determines that the manifest is the first manifest received for the media content, the method 200 proceeds to step 208. At step 208, the method 200 creates a global manifest. The global manifest represents a global state of media fragments in the system 100. The received manifest may include, for example, entries for fragment1, fragment2, and fragment3. The method 200 proceeds to step 210.

However, if at step 206, the method 200 determines that the received manifest is not the first manifest received for the media content, the method 200 proceeds to step 210.

At step 210, the method 200 determines whether the received manifest includes any entries after a last entry in the global manifest. If, for example, the global manifest already includes entries for fragment1, fragment2, fragment3, and fragment4, and the received manifest includes entries for fragment1, fragment2, fragment3, and fragment4, fragment5, and fragment 6, the method 200 determines that fragment5 and fragment6 are entries after the last entry (i.e., the entry for fragment4) in the global manifest. If the method 200 determines that the manifest does not include any entries for fragments after the last entry in the global manifest, the method 200 proceeds to step 204 to receive a manifest from a same or different packager. However, if the method 200 determines that the manifest includes entries after the last entry in the global manifest, the method 200 proceeds to step 212.

At step 212, the method 200 determines whether a gap exists in the entries in the manifest. For example, if the manifest includes entries for fragment1, fragment2, fragment3, and fragment4, and fragment 6, there is a gap in the entries. There is no entry for fragment5. The gap may occur because of a network problem, such as an outage at a packager, which resulted in the media content associated with fragment5 not being received. Alternatively, the gap may occur if the media content associated with fragment5 was received at the packager, but was corrupted or had missing data. In such case, the packager drops fragment5 and sends the manifest with a gap (i.e., without fragment5). If the method 200 determines that no gap exists in the entries, the method 200 proceeds to step 214, where the method 200 extends the global manifest to include the entries. For example, if the global manifest already includes entries for fragment1, fragment2, fragment3, and fragment4, and the received manifest includes entries for fragment1, fragment2, fragment3, and fragment4, fragment5, and fragment 6, the method 200 appends the global manifest to include the entries for fragment5, and fragment 6. The method 200 then proceeds to step 220.

However, if at step 212, the method 200 determines that there are gaps in the manifest, the method 200 proceeds to step 216. At step 216, the method 200 waits to receive a manifest from the same or different packager. The method 200 determines the difference between a start-time of the gap and an end-time of a last fragment entry in the manifest. When the difference exceeds a predefined wait threshold, for example, three fragments, the method 200 extends the manifest with the gap and the fragments entries following the gap. If more than one gap exists in the manifest, the method 200 determines whether the predefined wait threshold is exceeded for each gap and extends the manifest accordingly.

For example, suppose fragment5 is missing from a manifest. The manifest includes fragment3, fragment4, fragment6, and fragment7. There are two fragments beyond the missing fragment in the manifest (i.e., 7−5=2). The wait-threshold corresponds to three (3) fragments. Because there are only two (2) fragments, the global manifest is not extended to include the gap. However, suppose, for example that the manifest includes fragment4, fragment6, and fragment9. The last fragment in the manifest, fragment9 is four (4) fragments higher than the missing fragment5. As such, the global manifest is extended to include the gap for fragment5. Fragment6 is appended to the global manifest. However, fragment7 and fragment8 are within the wait threshold as 9−7<3. Therefore, the global manifest is not extended to include the gaps for fragment7 and fragment8. The method 200 determines whether the difference between the gap and an end-time of a last fragment referenced in the manifest exceeds the predefined wait threshold. When the wait threshold is exceeded, the manifest extension module extends the global manifest with the entries that include the gap.

If the predefined wait time is not exceeded, the method 200 proceeds to step 210.

However, if the method 200 waits the predefined period of time and has not received another manifest, the method 200 proceeds to step 218, where the method 200 extends the manifest with the gap. The method 200 can only wait the pre-defined threshold because at some point in time a media player needs the media content to continue to play. The pre-defined wait threshold provides enough time for the packagers in the system to provide their manifests. The method 200 proceeds to step 220, where the method 200 determines if the media content has reached an end. If the media content has not reached an end, the method 200 proceeds to step 204 and iterates until the media content has reached an end, at which time the method 200 proceeds to step 222 and ends.

Figure 3:
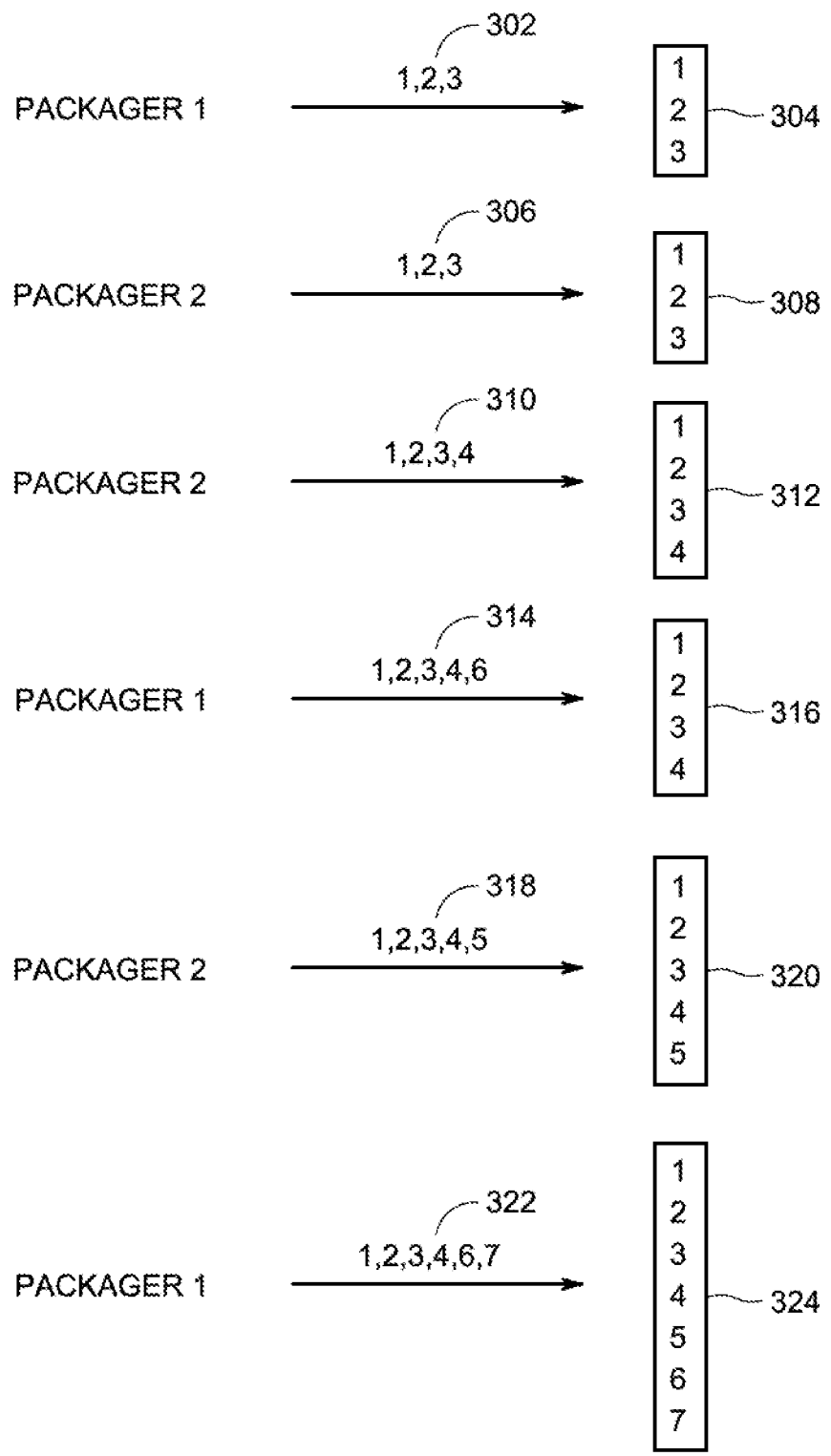
FIG. 3 illustrates a process of extending a manifest, according to one or more embodiments.

FIG. 3 illustrates a process of extending a manifest to provide fault tolerance in a streaming media system, according to one or more embodiments. Initially, an origin server receives a manifest 302 from a first packager, packager1 that includes entries for fragments 1, 2, and 3. A global manifest 304 is created that includes entries for fragments 1, 2, and 3. The origin server then receives a manifest 306 from a second packager, packager2 that includes entries for fragments 1, 2, and 3. Because the manifest 306 from the packager2 does not include any entries after the last entry in the current global manifest (i.e., entry for fragment3), a global manifest 308 is not an extended version of global manifest 304 and includes entries for fragments 1, 2, and 3. The origin server then receives a manifest 310 from packager2 that includes entries for fragments 1, 2, 3, and 4. Because the manifest 310 includes an entry after the last entry in the global manifest 308, a global manifest 312 is created by extending the global manifest 308 to include an entry for fragment4. The global manifest 312 then includes entries for fragments 1, 2, 3, and 4.

The origin server then receives a manifest 314 from the packager1 that includes entries for fragments 1, 2, 3, 4, and 6. The manifest 314 includes entries after the last entry in the global manifest 312. Specifically, the manifest 314 includes an entry for fragment6. However, the manifest 314 includes a gap in the sequence of 1, 2, 3, 4, and 6. That is, there is no entry for fragment5. Therefore, the global manifest 312 is not extended. A global manifest 316 is created that includes entries for fragments 1, 2, 3, and 4. The origin server then receives a manifest 318 from the packager2. The manifest 318 includes entries for fragments 1, 2, 3, 4, and 5. The manifest 318 includes an entry for a fragment after the last fragment in the global manifest 316. In addition, there is no gap in the sequence of entries for the fragments in manifest 318 that occur after the last fragment in the global manifest 316. As such, the global manifest 316 is extended to include fragment5 to create a global manifest 320 that includes entries for fragments 1, 2, 3, 4, and 5. The origin server then receives a manifest 322 from the packager1 that includes entries for fragments 1, 2, 3, 4, 6, and 7. The manifest 322 includes entries for fragments after the last entry in the global manifest 320. Although there is a gap in the entries in manifest 322, there is not a gap in the sequence of entries for the fragments in manifest 322 that occur after the last entry in the global manifest 320. As such, the global manifest 320 is extended to create a global manifest 324 that includes entries for fragments 1, 2, 3, 3, 5, 6, and 7. Although the packager1 did not have fragment5, the origin server was able to store the fragment5 received from the packager2, thereby providing fault tolerance and serving a complete sequence of entries in the global manifest such that the media content may be viewed without interruption.

The embodiments of the present invention may be embodied as methods, apparatus, electronic devices, and/or computer program products. Accordingly, the embodiments of the present invention may be embodied in hardware and/or in software (including firmware, resident software, micro-code, etc.), which may be generally referred to herein as a "circuit" or "module". Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium include the following: hard disks, optical storage devices, a transmission media such as those supporting the Internet or an intranet, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object oriented programming language, such as Java®, Smalltalk or C++, and the like. However, the computer program code for carrying out operations of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

The methods described herein may be implemented in software, hardware, or a combination thereof, in different embodiments. In addition, the order of methods may be changed, and various elements may be added, reordered, combined, omitted, modified, etc. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

The invention claimed is:

1. A computer implemented method comprising:
   creating, by at least one server, a global manifest comprising a plurality of consecutive entries extracted from a first manifest and a sequence indicating an order for playing media fragments associated with the consecutive entries on a media player at a client device;
   receiving, by the at least one server, a second manifest comprising an additional entry that follows a last entry of the plurality of consecutive entries in the sequence;
   identifying, by the at least one server, a sequence gap between the last entry and the additional entry;
   determining, by the at least one server, that the sequence gap includes a number of missing entries that exceeds a minimum threshold of entries between the last entry and the additional entry;
   upon determining that the sequence gap exceeds the minimum threshold, extending, by the at least one server, the global manifest to include the sequence gap and the additional entry after the last entry in the plurality of consecutive entries; and
   sending, by the at least one server over a network, the global manifest to the client device.

2. The method of claim 1, wherein extending the global manifest comprises appending the sequence gap and the additional entry to the global manifest.

3. The method of claim 1, wherein the global manifest represents a global state of available media fragments in a content delivery system.

4. The method of claim 1, further comprising serving the media fragments to the media player in accordance with the global manifest.

5. The method of claim 1, wherein the first manifest is received from a packager, and wherein receiving the second manifest comprises receiving the second manifest from the same packager.

6. The method of claim 1, wherein the first manifest is received from a first packager, and wherein receiving the second manifest comprises receiving the second manifest from a second packager.

7. The method of claim 1, further comprising:
   receiving a third manifest comprising one or more additional entries that follow the additional entry of the second manifest in the sequence;
   identify that the one or more additional entries comprise an additional sequence gap between the additional entry and the one or more additional entries;
   determining that the additional sequence gap does not exceed the minimum threshold of entries between the additional entry and the one or more additional entries; and
   upon determining that the additional sequence gap does not exceed the minimum threshold of entries between the additional entry and the one or more additional entries, not extending the global manifest to include the one or more additional entries.

8. The method of claim 7, wherein the first manifest is receiving from a first packager; and wherein:
   receiving the second manifest comprises receiving the second manifest from a second packager; and
   receiving the third manifest comprises receiving the third manifest from the first or second packager.

9. A system comprising:
   at least one processor; and
   at least one non-transitory computer readable storage medium storing instructions thereon that, when executed by the at least one processor, cause at least one server to:
   create a global manifest comprising a plurality of consecutive entries extracted from a first manifest and a sequence indicating an order for playing media fragments associated with the consecutive entries on a media player at a client device;
   receive a second manifest comprising an additional entry that follows a last entry of the plurality of consecutive entries in the sequence;
   identify a sequence gap between the last entry and the additional entry;
   determine that the sequence gap includes a number of missing entries that exceeds a minimum threshold of entries between the last entry and the additional entry;
   upon determining that the sequence gap exceeds the minimum threshold, extend the global manifest to include the sequence gap and the additional entry after the last entry in the plurality of consecutive entries; and
   send, over a network, the global manifest to the client device.

10. The apparatus of claim 9, wherein extending the global manifest comprises appending the sequence gap and the additional entry to the global manifest.

11. The apparatus of claim 9, wherein the global manifest represents a global state of available media fragments in a content delivery system.

12. The system of claim 9, wherein the first manifest is receiving from a packager, and wherein receiving the second manifest comprises receiving the second manifest from the same packager.

13. The system of claim 9, wherein the first manifest is received from a first packager, and wherein receiving the second manifest comprises receiving the second manifest from a second packager.

14. The system of claim 9, further comprising instructions that, when executed by the at least one processor, cause the at least one server to:
   receive a third manifest comprising one or more additional entries that follow the additional entry of the second manifest in the sequence;
   identify that the one or more additional entries comprise an additional sequence gap between the additional entry and the one or more additional entries;
   determine that the additional sequence gap does not exceed the minimum threshold of entries between the additional entry and the one or more additional entries; and
   upon determining that the additional sequence gap does not exceed the minimum threshold of entries between the additional entry and the one or more additional entries, not extend the global manifest to include the one or more additional entries.

15. A non-transitory computer readable medium for storing computer instructions that, when executed by at least one processor, cause at least one server to:
- create a global manifest comprising a plurality of consecutive entries extracted from a first manifest and a sequence indicating an order for playing media fragments associated with the consecutive entries on a media player at a client device;
- receive a second manifest comprising an additional entry that follows a last entry of the plurality of consecutive entries in the sequence;
- identify a sequence gap between the last entry and the additional entry;
- determine that the sequence gap includes a number of missing entries that exceeds a minimum threshold of entries between the last entry and the additional entry;
- upon determining that the sequence gap exceeds the minimum threshold, extend the global manifest to include the sequence gap and the additional entry after the last entry in the plurality of consecutive entries; and
- send, from the at least one server over a network, the global manifest to the client device.

16. The non-transitory computer readable medium of claim 15, wherein extending the global manifest comprises appending the sequence gap and the additional entry to the global manifest.

17. The non-transitory computer readable medium of claim 15, wherein the global manifest represents a global state of available media fragments in a content delivery system.

18. The non-transitory computer readable medium of claim 15, wherein the first manifest is receiving from a packager, and wherein receiving the second manifest comprises receiving the second manifest from the same packager.

19. The non-transitory computer readable medium of claim 15, wherein the first manifest is received from a first packager, and wherein receiving the second manifest comprises receiving the second manifest from a second packager.

20. The non-transitory computer readable medium of claim 15, further comprising instructions that, when executed by the at least one processor, cause the at least one server to:
- receive a third manifest comprising one or more additional entries that follow the additional entry of the second manifest in the sequence;
- identify that the one or more additional entries comprise an additional sequence gap between the additional entry and the one or more additional entries;
- determine that the additional sequence gap does not exceed the minimum threshold of entries between the additional entry and the one or more additional entries; and
- upon determining that the additional sequence gap does not exceed the minimum threshold of entries between the additional entry and the one or more additional entries, not extend the global manifest to include the one or more additional entries.

* * * * *